Patented June 29, 1954

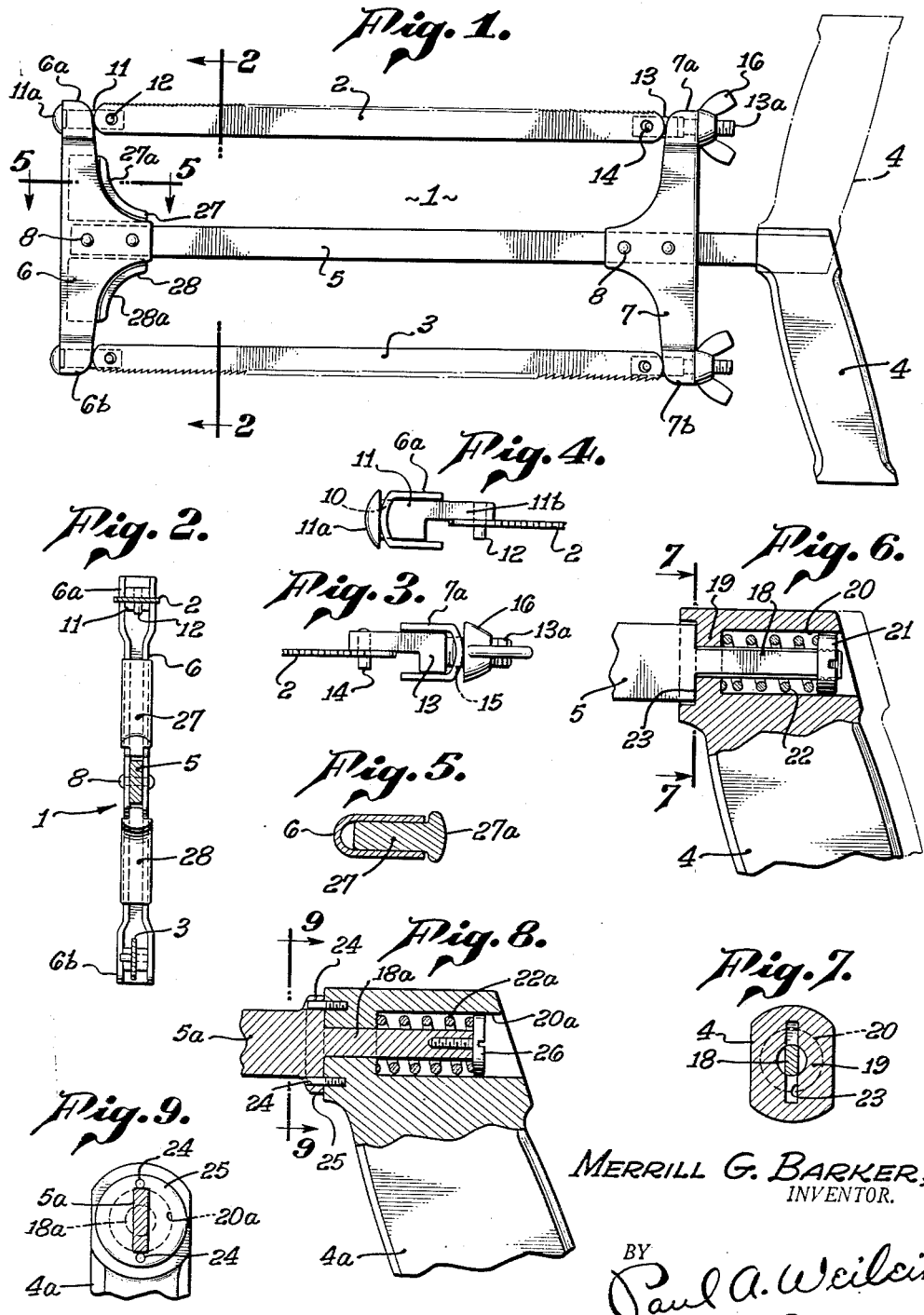

2,682,286

UNITED STATES PATENT OFFICE 2,682,286

SAW FRAME WITH ANGULARLY ADJUSTABLE HANDGRIP

Merrill G. Barker, Alhambra, Calif.

Application May 17, 1949, Serial No. 93,739

2 Claims. (Cl. 145—33)

This invention relates to hack saws and the like wherein a narrow saw blade is tensioned in a frame having a hand grip; more particularly it relates to a novel frame for such saws.

It is an object of this invention to provide a hack saw or the like having a plurality of cutting edges.

It is another object of this invention to provide a hack saw or the like having a plurality of blades with cutting edges of the same or different characteristics and optionally usable in accordance with the position of the frame.

It is another object of this invention to provide a hack saw or the like having a plurality of blades optionally positionable to alter the direction of the cutting edges with respect to the frame.

It is another object of this invention to provide a hack saw or the like with a frame mounting a pair of blades, and having an angularly adjustable hand grip.

It is another object of this invention to provide a hack saw or the like having a frame with a hand grip, mounting a plurality of blades, wherein the frame may be adjusted to alter the direction of the cutting edges with respect to the hand grip, and further the blades independently adjustable to alter the direction of the cutting edges with respect to the frame.

It is still another object of this invention to provide a frame for a saw structure adapted to mount a pair of blades.

This invention possesses many other advantages and has other objects which may be made more easily apparent from a consideration of several embodiments of the invention. For this purpose there are shown several forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

In the accompanying drawings:

Figure 1 is an elevation of a hack saw incorporating the features of the invention;

Figure 2 is a cross section on an enlarged scale, taken substantially as indicated by line 2—2 of Figure 1, but showing a different adjusted position of the parts;

Figures 3 and 4 are fragmentary plan views on an enlarged scale showing the manner of securing the blades in the frame;

Figure 5 is a detail section taken substantially as indicated by line 5—5 of Figure 1;

Figure 6 is a fragmentary longitudinal section showing the manner of attaching the handle;

Figure 7 is a cross section, taken substantially as indicated by line 7—7 of Figure 6;

Figure 8 is a view similar to Figure 6, but showing a modified form of handle mounting; and Figure 9 is a cross section, taken substantially as indicated by line 9—9 of Figure 8.

Referring to the drawing and particularly Figures 1 and 2, a frame generally indicated by the numeral 1 is shown as mounting a pair of narrow flexible saw blades 2 and 3, for example hack saw blades, in parallel spaced relation. These blades 2 and 3 may have teeth of different characteristics, suitable for operating on different materials or under different conditions. Thus, the teeth on blade 2 are much finer than the teeth on blade 3. The frame 1 has a hand grip 4 secured thereon, adjustable between the full line position Figure 1, for using the saw blade 3 and the broken line position 180° therefrom, for using the blade 2. Furthermore, each of the saw blades 2, 3 is mounted on the frame 1 for adjustment to direct the cutting edge at a right angle in either direction from the frame (Figure 2) or in the opposite direction should such be desirable.

Referring to Figures 1 to 5, the frame 1 comprises a longitudinally extending bar 5 with a pair of cross arms 6 and 7 extending transversely thereof substantially equal distances on opposite sides of the bar 1. As shown, the arms 6 and 7 are formed of sheet metal bent to a flattened U-cross section and secured by rivets 8, but obviously, the cross arms 6 and 7 could be of a different cross section made integrally with the bar 5, as by a casting operation if desired.

The outer end portion of each arm 6 and 7 is slightly widened as at 6–a, 6–b and 7–a, 7–b to accommodate a conventional mounting for a hack saw blade. Since these mountings are identical only one, that for blade 2, will be described. Thus, the arm end portion 6–a is provided with an opening 10 through the bottom of the U which slidingly accommodates a square block 11 with a head 11–a and cut away to provide a blade receiving tongue 11–b with a pin or hook 12 for engaging an aperture in the end of the blade 2. The block 11 is of such size as to slide freely between the sides of the portion 6–a but is prevented from turning thereby.

A similar block 13 is provided in the arm end portion 7–a (having a pin or hook 14 for engaging an aperture in the other end of the blade 2. However, block 13 has a threaded extension 13-a extending through the opening 15 in the end portion 7-a, and engaged by a wing nut 16 exteriorly of the said end portion, the arrangement being such that tightening the nut 16 tensions the blade 2 between the arms 6 and 7.

By removing the wing nut 16, the blocks 11 and 13 may be removed and replaced in positions adjusted by 90° increments, so that the saw blade 2 optionally may have its cutting edge directed at 90° with the frame 1 on either side thereof, or directed inwardly toward the bar 5.

As shown in Figures 6 and 7, the longitudinal bar 5 has a reduced portion forming a pintle 18 for rotatably supporting the handle or hand grip 4. This pintle 18 extends through an apertured wall 19 into a cylindrical bore 20 in the handle and has a circular nut 21 threaded on its outer end. The nut 21 by engagement with the surface of the bore 20 cooperates with the apertured wall 19 to rotatably mount the handle 4. A spring 22 confined between the wall 19 and the nut 21 urges the end of the bar 5 into a slot 23 on the handle 4 preventing rotation thereof. When it is desired to alter the position of the handle 4, the handle is moved to the right (Figure 6) to free the bar 5 from the slot 23, turned 180° and allowed to reengage the bar.

In Figures 8 and 9, the handle 4-a has a pair of projecting pins 24 which engage apertures in a flange 25 provided on the end of the bar 5-a to maintain the handle 4-a in adjusted position on the reduced portion 18-a thereof. A special large headed screw 25 retains the spring 23-a in the bore 20-a and provides a supplemental bearing. Movement of the handle 4-a to the right (Figure 8) serves to disengage the pins 24 from the flange 25 allowing adjustment of the handle as before.

The conventional manner of using a hack saw is to grasp the handle in one hand and reciprocate the saw thereby, and to apply additional reciprocating force as well as force urging the saw in cutting direction by grasping the outer end of the saw frame in the other hand. To facilitate the latter and protect the user's hand, a pair of fillers 27 and 28, formed for example of a suitable plastic, are mounted in the cross arm 6 on opposite sides of the bar 5, being frictionally retained in place, and providing smooth concave surfaces 27-a and 28-a for engagement by the user's hand.

I claim:

1. A saw frame including a longitudinally extending bar with a pair of arms having blade engaging means for supporting a saw blade in tension; a hand grip; and means securing said hand grip to said frame in adjusted angular position transversely of said blade; said means comprising a reduced end of said bar forming a pintle for supporting the hand grip for rotary and axial movement thereon; the unreduced portion of the bar at the juncture of the bar with said pintle being flattened; there being a recess in said hand grip engageable by said flattened portion to prevent relative rotation between the hand grip and the frame; and spring means urging relative axial movement between said hand grip and said frame to cause engagement of said flattened portion with said recess.

2. A saw frame including a longitudinally extending bar with a pair of arms having blade engaging means for supporting a saw blade in tension; a hand grip; one end of said bar being reduced to form a pintle; said hand grip having a bore into which said pintle extends; the end of the bore adjacent the frame having a reduced portion rotatably engaging the pintle and forming a shoulder; said pintle having an element secured thereon within said bore; interengageable means respectively on the unreduced portion of said bar on opposite sides of said pintle and on said hand grip for restraining angular movement between said frame and said hand grip; and spring means confined between said element and said shoulder, urging said hand grip axially on said pintle in a direction to cause engagement of said interengageable means.

References Cited in the file of this patent

UNITED STATES PATENTS

| Number | Name | Date |
| --- | --- | --- |
| 327,776 | Eisenhardt | Oct. 6, 1885 |
| 1,731,093 | Bouquet | Oct. 8, 1929 |
| 2,102,782 | Blum | Dec. 21, 1937 |
| 2,137,742 | Jack | Nov. 22, 1938 |

FOREIGN PATENTS

| Number | Country | Date |
| --- | --- | --- |
| 574,393 | France | Mar. 28, 1924 |
| 311,900 | Great Britain | May 23, 1929 |
| 94,123 | Sweden | Jan. 9, 1939 |